US012617288B2

(12) United States Patent
Younkins et al.

(10) Patent No.: US 12,617,288 B2
(45) Date of Patent: May 5, 2026

(54) ELECTRIC MACHINE TORQUE ADJUSTMENT BASED ON WAVEFORM MULTIPLES

(71) Applicant: Tula eTechnology Inc., San Jose, CA (US)

(72) Inventors: Matthew Younkins, Los Gatos, CA (US); Mark Wilcutts, Berkeley, CA (US)

(73) Assignee: Tula eTechnology, Inc., San Jose, CA (US)

( * ) Notice: Subject to any disclaimer, the term of this patent is extended or adjusted under 35 U.S.C. 154(b) by 156 days.

(21) Appl. No.: 18/585,647

(22) Filed: Feb. 23, 2024

(65) Prior Publication Data

US 2024/0190259 A1 Jun. 13, 2024

Related U.S. Application Data

(63) Continuation-in-part of application No. 17/886,640, filed on Aug. 12, 2022, now Pat. No. 11,916,498.

(60) Provisional application No. 63/241,888, filed on Sep. 8, 2021.

(51) Int. Cl.
B60L 15/00 (2006.01)
(52) U.S. Cl.
CPC ....... B60L 15/007 (2013.01); *B60L 2240/421* (2013.01); *B60L 2240/423* (2013.01)
(58) Field of Classification Search
CPC ............. B60L 15/007; B60L 2240/421; B60L 2240/423
USPC ............................... 318/400.02, 400.01, 700
See application file for complete search history.

(56) References Cited

U.S. PATENT DOCUMENTS

| | | | |
|---|---|---|---|
| 4,441,043 A | 4/1984 | Decesare | |
| 4,989,146 A | 1/1991 | Imajo | |
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,619,114 A | 4/1997 | Blasko | |
| 5,640,073 A | 6/1997 | Ikeda | |

(Continued)

FOREIGN PATENT DOCUMENTS

| | | |
|---|---|---|
| CN | 1829070 | 9/2006 |
| CN | 102381265 | 3/2012 |

(Continued)

OTHER PUBLICATIONS

Cai et al., "Torque Ripple Reduction for Switched Reluctance Motor with Optimized PWM Control Strategy", Energies, vol. 11, Oct. 15, 2018, pp. 1-27.

(Continued)

*Primary Examiner* — David Luo
(74) *Attorney, Agent, or Firm* — Brooks, Cameron & Huebsch, PLLC

(57) ABSTRACT

Methods, systems, and devices for electric machine torque adjustment based on waveform multiples are disclosed herein. One electric machine controller, arranged to direct pulsed operation of an electric machine, utilizes a pulse controller that calculates a first average measured torque from sensed torque values over a first time period and a second average measured torque from sensed torque values over a second time period, wherein the first and second time periods are different time periods.

20 Claims, 5 Drawing Sheets

(56) References Cited

U.S. PATENT DOCUMENTS

| | | | |
|---|---|---|---|
| 5,701,062 A | 12/1997 | Barrett | |
| 5,731,669 A | 3/1998 | Shimizu | |
| 6,218,801 B1 * | 4/2001 | Brogårdh | B25J 9/1674 |
| | | | 318/568.22 |
| 6,291,960 B1 | 9/2001 | Crombez | |
| 6,308,123 B1 | 10/2001 | Ikegaya et al. | |
| 6,370,049 B1 | 4/2002 | Ang | |
| 6,424,799 B1 | 7/2002 | Gilmore | |
| 6,493,204 B1 | 12/2002 | Glidden et al. | |
| 6,605,912 B1 | 8/2003 | Bharadwaj et al. | |
| 6,654,548 B2 * | 11/2003 | Schmitz | H02P 7/288 |
| | | | 388/825 |
| 6,829,515 B2 | 12/2004 | Grimm | |
| 6,829,556 B2 | 12/2004 | Kumar | |
| 6,906,485 B2 | 6/2005 | Hussein | |
| 6,940,239 B2 | 9/2005 | Iwanaga et al. | |
| 7,109,674 B2 * | 9/2006 | Benchaib | H02P 21/05 |
| | | | 318/434 |
| 7,190,143 B2 | 3/2007 | Wei et al. | |
| 7,259,664 B1 | 8/2007 | Cho et al. | |
| 7,327,545 B2 | 2/2008 | Konishi | |
| 7,411,801 B2 | 8/2008 | Welchko et al. | |
| 7,453,174 B1 | 11/2008 | Kalsi | |
| 7,558,655 B2 | 7/2009 | Garg et al. | |
| 7,577,511 B1 | 8/2009 | Tripathi et al. | |
| 7,616,466 B2 | 11/2009 | Chakrabarti et al. | |
| 7,768,170 B2 | 8/2010 | Tatematsu et al. | |
| 7,852,029 B2 | 12/2010 | Kato et al. | |
| 7,969,341 B2 | 6/2011 | Robbe et al. | |
| 8,020,651 B2 | 9/2011 | Zillmer et al. | |
| 8,099,224 B2 | 1/2012 | Tripathi et al. | |
| 8,768,563 B2 | 7/2014 | Nitzberg et al. | |
| 8,773,063 B2 | 7/2014 | Nakata | |
| 8,937,446 B2 | 1/2015 | Clothier et al. | |
| 9,046,559 B2 | 6/2015 | Lindsay et al. | |
| 9,050,894 B2 | 6/2015 | Banerjee et al. | |
| 9,308,822 B2 | 4/2016 | Matsuda | |
| 9,495,814 B2 | 11/2016 | Ramesh | |
| 9,512,794 B2 | 12/2016 | Serrano et al. | |
| 9,630,614 B1 | 4/2017 | Hill et al. | |
| 9,702,420 B2 | 7/2017 | Yoon | |
| 9,758,044 B2 | 9/2017 | Gale et al. | |
| 9,948,173 B1 | 4/2018 | Abu Qahouq | |
| 10,060,368 B2 | 8/2018 | Pirjaberi et al. | |
| 10,081,255 B2 | 9/2018 | Yamada et al. | |
| 10,256,680 B2 | 4/2019 | Hunstable | |
| 10,273,894 B2 | 4/2019 | Hunstable | |
| 10,291,168 B2 | 5/2019 | Fukuta | |
| 10,291,174 B2 | 5/2019 | Irie et al. | |
| 10,340,821 B2 | 7/2019 | Magee et al. | |
| 10,344,692 B2 | 7/2019 | Nagashima et al. | |
| 10,381,968 B2 | 8/2019 | Agirman | |
| 10,476,421 B1 | 11/2019 | Khalil et al. | |
| 10,543,604 B2 * | 1/2020 | Shimizu | G01L 3/00 |
| 10,550,776 B1 | 2/2020 | Leone et al. | |
| 10,637,367 B2 * | 4/2020 | Pfeiffer | H02P 23/06 |
| 10,742,155 B2 | 8/2020 | Tripathi | |
| 10,763,772 B1 | 9/2020 | Fatemi et al. | |
| 10,944,352 B2 | 3/2021 | Mazda et al. | |
| 11,077,759 B1 | 8/2021 | Srinivasan et al. | |
| 11,088,644 B1 | 8/2021 | Carvell | |
| 11,133,763 B1 | 9/2021 | Islam | |
| 11,133,767 B2 | 9/2021 | Serrano et al. | |
| 11,167,648 B1 | 11/2021 | Carvell et al. | |
| 11,228,272 B2 | 1/2022 | Tripathi | |
| 11,695,361 B2 | 7/2023 | Carvell et al. | |
| 2001/0039926 A1 | 11/2001 | Kobayashi et al. | |
| 2002/0043954 A1 | 4/2002 | Hallidy | |
| 2003/0173931 A1 | 9/2003 | Edelson | |
| 2004/0212359 A1 | 10/2004 | Slater et al. | |
| 2005/0127861 A1 | 6/2005 | Mcmillan et al. | |
| 2005/0151437 A1 | 7/2005 | Ramu | |
| 2005/0160771 A1 | 7/2005 | Hosoito et al. | |
| 2007/0216345 A1 | 9/2007 | Kanamori | |
| 2007/0287594 A1 | 12/2007 | Degeorge et al. | |

| | | |
|---|---|---|
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Welchko et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |
| 2023/0223885 A1 | 7/2023 | Tripathi |

FOREIGN PATENT DOCUMENTS

| | | |
|---|---|---|
| CN | 104716754 | 6/2015 |
| CN | 204589885 | 8/2015 |
| CN | 105196877 | 12/2015 |
| CN | 205229379 | 5/2016 |
| CN | 106932208 | 7/2017 |
| CN | 107067780 | 8/2017 |
| CN | 207129052 | 3/2018 |
| CN | 108216026 | 6/2018 |
| CN | 108445386 | 8/2018 |
| CN | 110212725 | 9/2019 |

(56) References Cited

FOREIGN PATENT DOCUMENTS

| DE | 102014206342 | 10/2015 |
|----|----|----|
| EP | 2605398 | 6/2013 |
| ES | 2816386 | 4/2021 |
| FR | 2989479 | 10/2013 |
| GB | 2273212 | 6/1994 |
| JP | 10-243680 | 9/1998 |
| JP | 2008-079686 | 4/2008 |
| JP | 2009-065758 | 3/2009 |
| JP | 2011067043 | 3/2011 |
| JP | 2014-033449 | 2/2014 |
| JP | 2017-011970 | 1/2017 |
| JP | 2017-200382 | 11/2017 |
| JP | 2018-033250 | 3/2018 |
| KR | 10-2010-0021146 | 2/2010 |
| KR | 10-2017-0021146 | 2/2017 |
| KR | 10-2017-0032976 | 3/2017 |
| WO | 03/36787 | 5/2003 |
| WO | 2012-010993 | 1/2012 |

OTHER PUBLICATIONS

Carvell et al, U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics, vol. 20, No. 5, Sep. 2005, pp. 1075-1083.

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC. 2012.6397346, ISBN: 978-1-4673-1970.6.
Ramsey, "How this father and son's new electric turbine could revolutionize electric cars; The Hunstable Electric Turbine can produce up to three times the torque of any other motor", Available Online at <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
Islam, U.S. Appl. No. 18/165,100, filed Feb. 6, 2023.
Farah et al., U.S. Appl. No. 18/184,569, filed Mar. 15, 2023.
Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.
International Search Report and Written Opinion from related PCT Application PCT/US2022/040153, dated Jan. 17, 2023, 13 pages.

* cited by examiner

ELECTRIC MACHINE TORQUE ADJUSTMENT BASED ON WAVEFORM MULTIPLES

PRIORITY INFORMATION

This application is a Continuation in Part of U.S. application Ser. No. 17/886,640, filed Aug. 12, 2022, which issues as U.S. Pat. No. 11,916,498 on Feb. 27, 2024, which claims the benefit of U.S. Provisional Application No. 63/241,888, filed on Sep. 8, 2021, the contents of which are included herein by reference.

TECHNICAL FIELD

The present disclosure relates to electric machine management methods, devices, and systems and, in particular, to electric machine torque adjustment based on waveform multiples

BACKGROUND

The phrase "electric machine" as used herein is intended to be broadly construed to include machines that operate as either or both electric motors and generators. When an electric machine is operating as a motor, it converts electrical energy into mechanical energy. When operating as a generator, the electric machine converts mechanical energy into electrical energy.

Electric motors and generators are used in a wide variety of applications and under a wide variety of operating conditions. In general, many modern electric machines have relatively high energy conversion efficiencies. However, the energy conversion efficiency of most electric machines can vary considerably based on their operational load. Many applications require that the electric machine operate under a wide variety of different operating load conditions, which means that the electric machine when operating in a continuous manner often does not operate as efficiently as it is capable of.

For example, for any given motor speed, the motor's efficiency tends to drop off somewhat when the motor's load is higher or lower than the most efficient load. In some performance areas, the motor's efficiency tends to drop relatively quickly.

If the operating conditions could be controlled so that the motor is almost always operated at or near its most efficient point, the energy conversion efficiency of the motor would be quite good. It has been proposed that the electric machine be pulsed during operation to achieve a condition where it is operating in its most efficient point more often.

When controlling a machine in pulsed operation, measurement or estimation of the torque output must be determined over a period of time. A conventional method to determine this torque output is to process measured or estimated torque as a function of time, for example, by averaging or using a digital filter of recent estimates or measurements of torque. When attempting to use these methods for an electric machine using pulsed operation, this can lead to inaccurate torque values as these methods can render inconsistent results.

DETAILED DESCRIPTION

Figure 1:
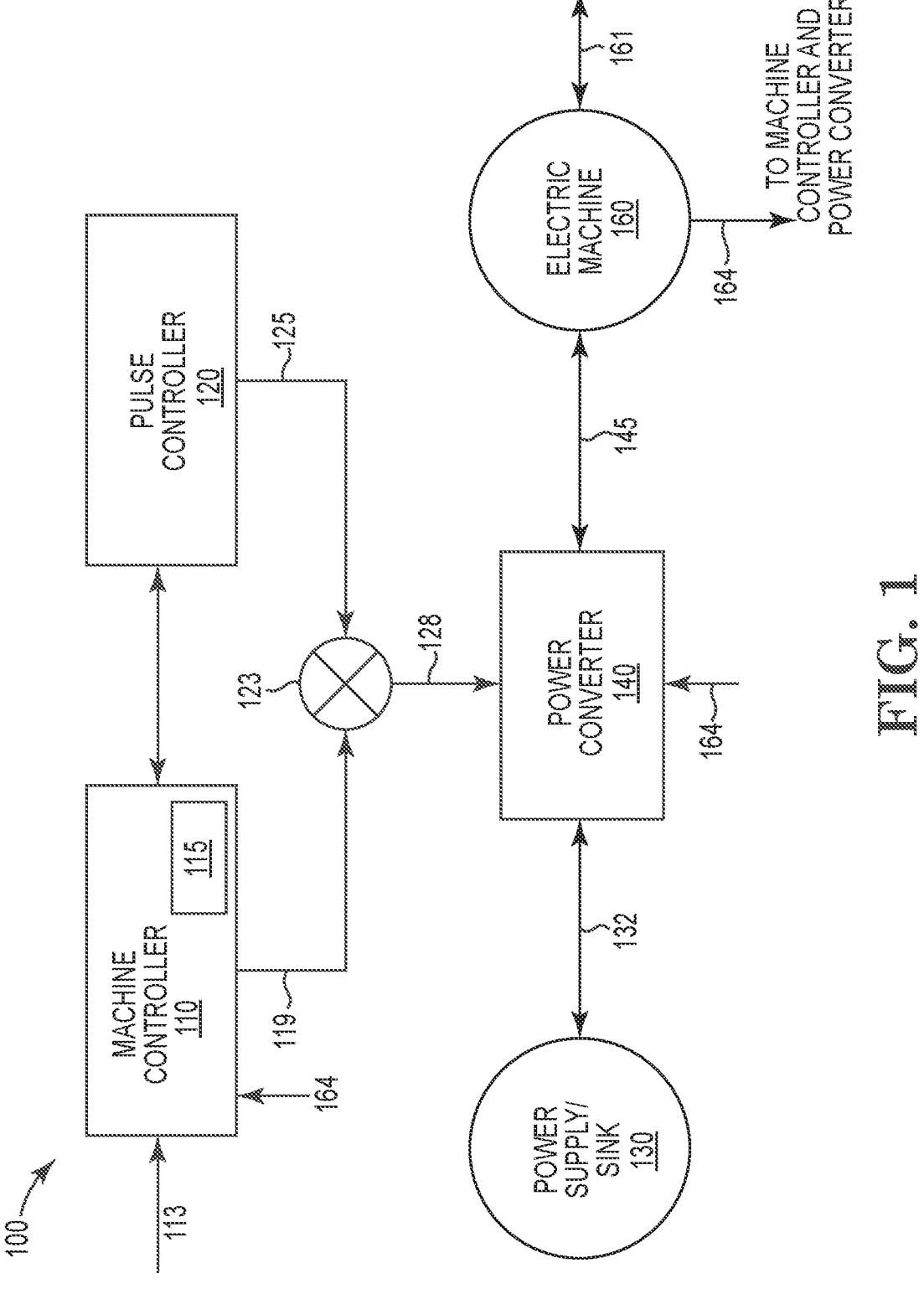
FIG. 1 is a functional block diagram that diagrammatically illustrates an electric machine control architecture in accordance with embodiments of the present disclosure.

The present disclosure provides a better way to utilize pulsed electric machine management by averaging pulsed outputs at multiples of the pulsed waveform. This can be accomplished by implementing a new electric machine pulsed control methodology.

Historical practices for electrical machine control have been developed for operation of motors subject to continuously variable torque control. For example, when electric machines are operated under a continuous power application scheme, if 100 Newton meters (Nm) of torque is desired to be delivered, the control system controlling the electric machine delivers 100 Nm's of electro-motive torque. However, in some implementations, advantages can be found to deliver larger amounts of torque over shorter time periods (pulsing torque delivery intermittently). This pulsing operation can be more efficient, and therefore, more desirable.

In such situations, if the desired torque output is 100 Nm's of torque over a period of time and, if the most efficient torque production is at 200 Nm's, the control system will deliver 200 Nm's of torque during 50% of that time period, providing the same aggregate 100 Nm's over the time period, but doing so more efficiently than if 100 Nm's were provided for the entire time period. The 200 Nm torque deliveries can be delivered in pulses that are spaced out over time. For example, a time period can have twenty segments, where ten of the segments are at 200 Nm's and ten of the segments are at 0 Nm's (e.g., alternating 200 Nm, 0 Nm, 200 Nm, 0 Nm, . . . ). Other implementation schedules are possible and may provide more desirable operation, providing, for example, more effective vibration control.

This pulsing technique relates generally to pulsed control of electric machines (e.g., electric motors and generators) that would otherwise be operated in a continuous manner. Such a pulsed technique can improve the energy conversion efficiency of the electric machine when operating conditions warrant. More specifically, under selected operating conditions, an electric machine is intermittently driven (pulsed) at more efficient energy conversion operating levels to deliver a desired average torque more energy efficiently than would be attained by traditional continuous motor control.

The pulses can be adjusted based on pulse width modulation (changing the duration that an electric machine is in an on state) or pulse density modulation (the number of pulses in a particular time period). The pulses can be adjusted in these ways based on the demands for torque output and performance and efficiency considerations. Some goals of such pulsing techniques are to produce accurate and responsive delivery of torque, but the torque control must also be achievable. For example, having the torque delivered in such a manner that the torque delivery is making the electric machine operate in performance areas that it is not designed to operate, would be an instance where the torque is out of control, as this could result in a safety or equipment damage issue, among other concerns.

Many types of electrical machines are traditionally driven by a continuous, albeit potentially varying, drive current when the machine is used as a motor to deliver a desired torque output. The drive current is frequently managed by controlling the output voltage of a power converter (e.g., an inverter) which serves as the voltage input to the motor. Conversely, the power output of many types of generators is managed by controlling the strength of a magnetic field, which may, for example, be accomplished by controlling an excitation current supplied to rotor coils by an exciter.

With pulsed control, the output of the machine is intelligently and intermittently modulated between "torque on" and "low torque" states in a manner that: (1) meets operational demands, while (2) improving overall efficiency. Stated differently, under selected operating conditions, the electric machine is intermittently driven at a more efficient energy conversion operating level (the "torque on" state) to deliver a desired output.

In the periods between the pulses, the machine ideally does not generate or consume any torque (the "low (e.g., zero) torque" state). This can conceptually be thought of as turning the electric machine "off." In some implementations, this can be accomplished by effectively turning the electric machine "off," as for example, by shutting off drive current to a motor or the excitation current for a generator. However, in other implementations, the electric machine may be controlled during the "low torque" state in a manner that attempts to cause the torque generated by the electric machine to be zero or as close to zero as may be practical or appropriate for the particular machine. In particular, for motors in which the magnetic field is induced in the rotor through electromagnetic fields in the stator, ('AC induction motors'), the time constant of field generation may necessitate keeping some level of continuous 'field' current in the electric motor. In some implementations, any power converters used in conjunction with the electric machine may effectively be turned off for at least portions of the "low torque" periods as well.

Control (e.g., feedback, feedforward, etc.) of electric machines is based on a continuous or effectively continuous control strategy. That is, at every moment during use of the electric machine, its control system is utilizing a control strategy to determine whether the electric machine is actuated or not. Under current pulsed control processes, estimates of meeting torque demand, etc., can become inaccurate, if utilizing sampling of the instantaneous torque or continuous averaging. Further, torque security processes can be inaccurate if only torque samples are used as the indicator for whether torque security is implemented properly.

For example, in order to determine when a pulse event should occur, a 'continuous average' is taken over time, either actual time or a predicted time in the future. However, with a pulse event, the electric machine's output is either on (indicated by a 1, for example in FIG. 4) or off (indicated by a zero, in FIG. 4). Currently, continuous averaging takes averages at increments smaller than a waveform cycle (a waveform cycle is a cycle in which a waveform starts at a particular value (e.g., 0.5) and returns to that same value). In some cases, the increments can be considerably smaller than a waveform cycle, such as millisecond or microsecond increments. From an averaging standpoint, using continuous averaging, the value rises and falls based on whether the electric machine is pulsed on or off.

As an example of the potential inaccuracies that can occur, if 1.5 waveform cycles are sampled, where during each waveform cycle the electric machine is pulsed from zero to one and then back to zero, the torque value goes from zero to one to zero and then to one again and the estimated torque output would be about 0.66, rather than the actual output of 0.5. This erroneous value could then be used to calculate how much torque to provide in subsequent pulses and/or the number of pulses needed over time, resulting in erroneous calculations, which could affect performance and/or efficiency.

In another example, if the controller is averaging at every millisecond or microsecond, but when coupled with a pulse density strategy wherein the pulses are at 50 Hz, then for the millisecond example, there will be averaged periods where the average torque is 0 Nm's and other times where the average torque is 200 Nm's, when the desire is to have the average be 100 Nm's as that is the desired torque output and is the actual output. The maximum error is based on the number of waveforms averaged, so averaging based on just a few waveforms that are not correlated with an integer-based approach can have high error levels.

One way to resolve this issue is to average over a larger time period (e.g., 10 seconds). Such a method would provide an average close to or at 100 Nm's, but the estimator would lose its responsiveness to changes to the torque input system (e.g., it would take ~10 seconds to reflect any meaningful change).

In contrast, the embodiments of the present disclosure provide a methodology that utilizes an averaging period that corresponds to multiples of the pulsing period (i.e., waveform cycle). Further, in the embodiments of the present disclosure, the control strategy utilizes averaging based at multiple intervals of the waveform cycle or segments of that cycle. In this manner, the averaging corresponds more accurately with the actual output over that time period. For example, at intervals that correspond to the waveform cycle or multiples thereof, the periodic averaging/feedback condition is accurate (i.e., 0.5 over one cycle where the electric machine is operating at 0 for half the cycle and 1 for half the cycle).

The embodiments taught herein can be particularly beneficial in dynamic environments such as where torque or speed are changing relatively often. They also allow the system to be highly accurate while also allowing the system to be responsive to different torque demands.

A variety of methods, controllers and electric machine systems are described that facilitate pulsed control of electric machines (e.g., electric motors and generators) to improve the energy conversion efficiency of the electric machine when operating conditions warrant. More specifically, under selected operating conditions, an electric machine controller is arranged to direct pulsed operation of an electric machine, wherein the electric machine controller utilizes a pulse controller that calculates an average torque based upon a time period that corresponds with an integer multiple of a waveform cycle or segments of that cycle of a pulse waveform.

Further, in some embodiments, an electric machine controller can cause pulsed operation of an electric machine to deliver a desired output, wherein the pulsed operation of the electric machine causes the output of the electric machine to alternate between a first output level and a second output level that is lower than the first output level, wherein the electric machine controller includes a pulse controller that directs timing of the pulsing of the electric machine according to a pulsed waveform over a particular time period and wherein the pulsed waveform is composed of a number of waveform cycles and the pulse controller calculates an average torque based upon a time period that corresponds with an integer multiple of the waveform cycles or segments of that cycle of the pulse waveform.

In some embodiments, the electric machine is driven in a pulsed manner when a desired output is less than a designated output level for a given motor speed and driven in a continuous manner when the desired motor output is greater than or equal to the designated output level.

In some embodiments, a power converter is used to control the output of the electric machine. Depending on the application, the power converter may take the form of an inverter, a rectifier, or other appropriate power converter.

The frequency of the pulsing may vary widely with the requirements of any particular application. By way of examples, in various embodiments the electric machine alternates between the first and second output levels at least 10, 100, or 1000 times per second.

In some embodiments, a system can include an electric machine, a power converter, and an electric machine controller that causes pulsed operation of an electric machine to deliver a desired output, wherein the pulsed operation of the electric machine causes the output of the electric machine to alternate between a first output level and a second output level that is lower than the first output level, wherein the electric machine controller includes a pulse controller that directs timing of the pulsing of the electric machine according to a pulsed waveform over a particular time period and wherein the pulsed waveform is composed of a number of waveform cycles and wherein the pulse controller calculates an average torque based upon a time period that corresponds with an integer multiple of the waveform cycles or segments of that cycle of the pulse waveform.

In other embodiments, a pulse width modulation controller is used to control the pulsing of the electric machine. And, in some other embodiments a delta-sigma modulation controller is used.

In some embodiments, the first output level varies in accordance with variations in the current operating speed of the electric machine. In various embodiments, the first output level may correspond to an electric machine output level that is or is close to the highest system or electric machine energy conversion efficiency at a current operating speed of the electric machine. In some embodiments, a duty cycle of the pulsing varies in accordance with variations in the desired output. In some embodiments, a duty cycle of the pulsing varies in accordance with variations in at least one of an operating speed, a torque, and a rotational speed times a number of poles (e.g., a four pole electric machine could adjust four times per revolution).

Machine controllers and electric machine systems are described for implementing all of the functionalities described above. In various embodiments, the system may be configured to operate as a motor, a generator, or as a motor/generator.

In various embodiments, the electric machine may be: an induction machine; a switched reluctance electric machine; a synchronous AC electric machine; a synchronous reluctance machine; a switched reluctance machine; a permanent magnet synchronous reluctance machine; a hybrid permanent magnet synchronous reluctance machine; an externally excited AC synchronous machine; a permanent magnet synchronous machine; a brushless DC electric machine; an electrically excited DC electric machine; a permanent magnet DC electric machine; a series wound DC electric machine; a shunt DC electric machine; a brushed DC electric machine; a compound DC electric machine; an eddy current machine; an AC linear machine; an AC or DC mechanically commutated machine; or an axial flux machine.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of valves" can refer to one or more valves. As used herein, "a plurality of" means two or more things.

FIG. 1 is a functional block diagram that diagrammatically illustrates an electric machine control architecture in accordance with embodiments of the present disclosure. There are a wide variety of different electric machines and each machine has its own unique efficiency characteristics. Therefore, the operating regions in which pulsed control can provide efficiency gains will vary significantly based on factors including the particular electric machine's characteristics and the current operational rotor speed.

In many applications of electric machines, power converters (e.g., inverters) will typically be used to convert power to or from the source to the voltage, current, and waveforms required by the electric machine. For example, inverters are used to convert power received from a DC power supply, such as a battery or capacitor, into the appropriate AC input power applied to a motor.

The energy conversion efficiency of power converters will also typically vary over the operating range of the converter. Thus, when optimizing control of a motor that is part of an inverter/electric motor combination, it is desirable to consider the energy conversion efficiency of the overall inverter/electric motor system as opposed to the energy conversion efficiency of the motor alone. Preferably, the pulsed control of an electric machine will be modeled to account for the efficiencies of any/all of the components that influence the energy conversion during pulsing. For example, when power for an electric motor is drawn from a battery, the battery's power delivery efficiency, cabling losses between components, and any other loss factors can be considered in addition to the inverter and motor efficiencies, when determining the motor drive signal that delivers the best energy conversion efficiency.

In general, the overall energy conversion efficiency of a power converter/electric machine system is a function of the product of the converter conversion efficiency times the electric machine conversion efficiency times the delivery efficiency of other components. Thus, it should be appreciated that the parameters of the pulsed drive signal that has the maximum system energy conversion efficiency may be different than the parameters that would provide the best energy conversion efficiency for the motor itself.

FIG. 1 illustrates a control architecture suitable for controlling an electric machine in the described manner. In this embodiment, the system 100 includes a machine controller 110, a pulse controller (pulse generator) 120, a power supply/sink 130, a power controller/converter 140, and an electric machine 160.

The pulse controller 120 is responsible for controlling/directing the timing of the pulsing of electric machine 160 when pulsed operation is called for. In the embodiment illustrated in FIG. 1, the pulse controller is shown as a component that is separate from the machine controller 110 to facilitate explanation of its function. However, in various embodiments, the pulse controller may be implemented as part of the machine controller 110, as a separate component, as part of power controller/converter 140, or in other appropriate forms.

When the electric machine 160 operated is a motor, the machine controller functions as a motor controller, and the power controller/converter 140 is responsible for converting power 132 received from power supply 130 to a form that is suitable for driving the motor 160. In embodiments in which the power supply/sink can supply or receive power directly in the form required by or outputted by the electric machine, the power controller 140 can conceptually take the form of a switch or logical multiplier that simply turns the motor on and off to facilitate the desired pulsing.

The power supply/sink 130 can take any suitable form. In some implementations, the power supply/sink may take the form of a battery or a capacitor. In other implementations, the source may be a power grid (e.g., "wall power"), a photovoltaic system, or any other available source. Similarly, the sink may be an electrical load (such as an electrically operated machine or appliance, a building, a factory, a home, etc.), a power grid, or any other system that uses or stores electrical power.

The power controller/converter 140 can also take a wide variety of different forms. When the power supply/sink 130 is a DC power supply and the electric machine 160 is an AC motor, the power controller/converter 140 can take the form of an inverter. Conversely, when the power supply/sink 130 is a DC power sink and the electric machine 160 is an AC generator, the power controller/converter 140 can take the form of a rectifier. When both the power supply/sink 130 and the electric machine are AC components, the power controller/converter 140 may include a bidirectional or 4 quadrant power converter.

In FIG. 1, the requested output is labeled 113, the torque delivered or received by the electric machine is labeled 161 and the motor/generator speed is labeled 164. In some embodiments, the machine controller 110 includes a data structure 115 (as, for example, a lookup table) that serves as a pulsed operation map that defines the operating region in which pulsed motor control is desired and/or appropriate as well as the specific duty cycles that are appropriate for specific operating conditions.

Once the desired duty cycle is determined, the duration and nature of the pulses used to drive the motor can be determined/generated in a wide variety of manners. As will be described in more detail below, one relatively simple approach is to use a pulse width modulation (PWM) controller as the pulse controller 120.

In FIG. 1, logical multiplier 123 is shown as multiplying a pulsed control signal 125 times a power level signal 119 output by machine controller 110 to create a power converter control signal 128. It should be appreciated that the logical multiplier 123 is shown for the purposes of explanation and in practice, the function of the multiplier 123 can be accomplished by the machine controller 110, by the power converter 140, or in other suitable manners. For example, in some embodiments, the machine controller 110 may simply set the output of the power converter 140 to zero during the "off" phases of the duty cycle and to the desired operational output level (e.g., the most efficient output level for the current machine speed) during the "on" phases of the duty cycle.

In some embodiments, the electric machine control system or vehicle control system can include a safety process that allows such a system to monitor data (e.g., analyzing power converter feedback signals, torque values, current drawn by the electric machine) to determine if there is a malfunction in the system that may result in a potentially unsafe application of torque. If a safety issue is determined, the controller can execute instructions to place the car in "limp mode" where upper limits to torque are further limited to protect the electric machine and/or a vehicle's occupants. If the condition continues, instructions can disable the power converter 140 (e.g., open the relay to the power source so that power converter cannot convert any power), thereby further reducing the risk of damage or injury.

This safety process can be accomplished by instructions executed by the machine controller 110 and/or by another vehicle controller (e.g., supervisory electronic control unit (ECU) or system level ECU) provided on the vehicle or electric machine to manage functions of the vehicle and/or electric machine. Accordingly, in utilizing embodiments of the present disclosure, the pulse controller 120 needs to take the safety limits into account, so that the pulse wave form (e.g., pulse width modulation (PWM)) does not incorrectly initiate any of the above safety measures.

For example, the machine controller 110 determines that there is a need for 50 Newton/meters of torque and that instruction request is sent to the power converter 140. However, the power converter responds with a feedback message indicating a PWM varying between 0 and 100. In such an example, the machine controller and/or other controller can then execute instructions to determine that the response provided is not the result that was requested and based on that result, take action to initiate a safety process.

However, in embodiments of the present disclosure, if the machine controller and/or vehicle controller has such a safety process function, then the information conveyed in the feedback message can be modified in such a manner as to not meet the threshold value of the safety process. For example, in some embodiments, before the feedback signals are sent to the controller determining whether the safety process is triggered, the torque data can be passed through a low-pass filter (e.g., 5 Hz) that removes signal data higher than the safety process threshold (e.g., 50 Hz). In various other embodiments, a PWM with a particular duty cycle is produced and instructions are executed by a controller (e.g., the machine controller 110) to determine a mean value over the time period of the PWM waveform (e.g., PWM=50 Hz and the values over that period can be averaged and then that averaged value can be provided as the feedback signal to be compared for safety process threshold for safety process purposes).

In some other embodiments, the safety process may compare a combination of torque values and current values to expected values for given torque values to determine whether the current is within an expected range of values.

Such expected current values for a number of torque values can be stored in memory, for example.

For instance, the power converter can be sending feedback signals indicating an output of 50 N/m of torque, but the sensed current (e.g., sensed at the power source, such as the power converter, battery, etc.) is 500 A. By comparing the sensed torque and current to a corresponding torque's current value or range of values, the controller can determine whether a safety process needs to be initiated.

Accordingly, as with the above embodiments, here, a low-pass filter can be applied to the current values to keep them below a safety process triggering threshold, in some embodiments, or an averaging process can be applied to the current, similar to that applied to the PWM waveform above, in other embodiments.

Figure 2:
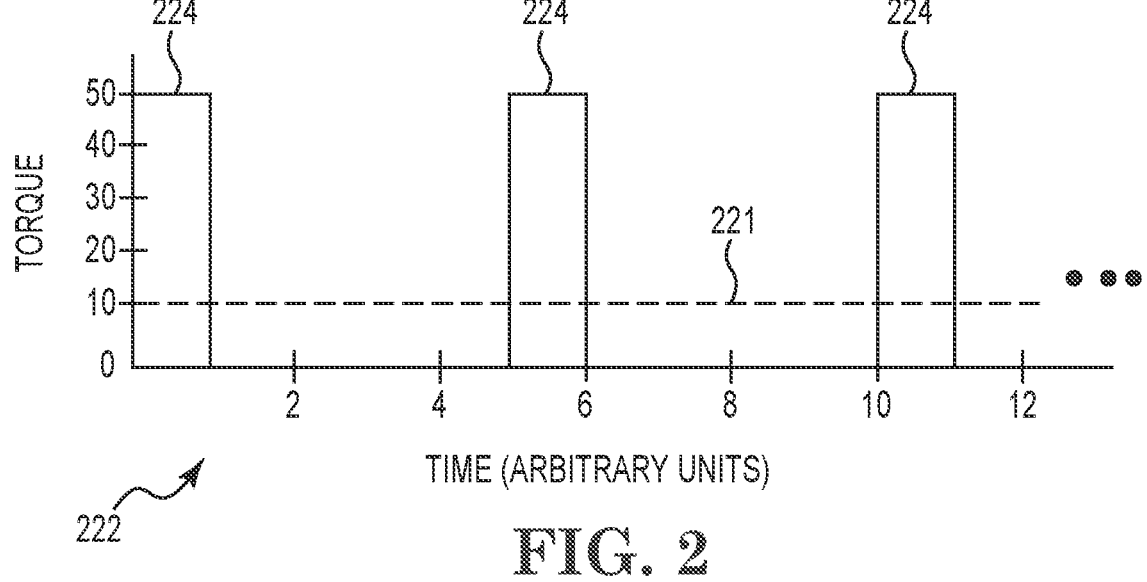
FIG. 2 is a graph illustrating a pulsed drive signal for an electric machine that may be used with embodiments of the present disclosure.

FIG. 2 is a graph illustrating a pulsed drive signal for an electric machine that may be used with embodiments of the present disclosure. FIG. 2 illustrates an example of pulsed electric machine operation 222. In this particular example, the desired electric machine torque is 10 Nm, but the most efficient torque output for the current operating motor speed is 50 Nm. Conceptually, the electric machine can be driven to deliver a net torque 221 of 10 Nm by causing the electric machine to deliver 50 Nm of torque for 20% of the time and then delivering no (zero) torque the remaining 80% of the time. Since the motor operates more efficiently when it is delivering 50 Nm than when it delivers 10 Nm, the electric machine's overall efficiency can be improved by pulsing the electric machine's operation in the described manner. In the example illustrated in FIG. 2, the electric machine produces a machine output of 50 Nm (labeled 224) for a period of 1 time unit out of every 5 time units and then the electric machine is controlled to produce zero torque during the intervening 4 time units.

As long as the desired electric machine output does not exceed 50 Nm, the desired machine output can theoretically be met merely by changing the duty cycle of the electric machine operating at 50 Nm. For example, if the desired electric machine output changes to 20 Nm, the duty cycle of the electric machine operating at 50 Nm can be increased to 40%; if the desired electric machine output changes to 40 Nm, the duty cycle can be increased to 80%; if the desired electric machine output changes to 5 Nm, the duty cycle can be reduced to 10% and so on. More generally, pulsing the electric machine can potentially be used advantageously any time that the desired electric machine torque falls below the maximum efficiency.

As discussed above, in some embodiments, the waveform frequency can change. In such instances, the waveform cycle will also change. This will allow for a very responsive, high fidelity feedback response for the controller.

For example, the scale of the time units actually used may vary widely based on the size, nature, and design needs of any particular system. In practice, when the electric machine is switched from the "torque on" to "low torque" states relatively rapidly to achieve the designated duty cycle, the fact that the electric machine is actually being switched back and forth between these states may not materially degrade the electric machine's performance from an operational standpoint. In some embodiments, the scale of the periods for each on/off cycle is expected to be on the order of 100 μsec to 10 seconds (i.e., pulsing at a frequency in the range of 0.1 to 10,000 Hz), as, for example, in the range of 20 to 1000 Hz, or 20 to 100 Hz.

The low torque portions of the waveform cycle might conceptually be viewed as shutting the electric machine off—although in many cases the motor may not actually be shut off during those periods or may be shut off for only portions of the "low torque" intervals.

Figure 3:
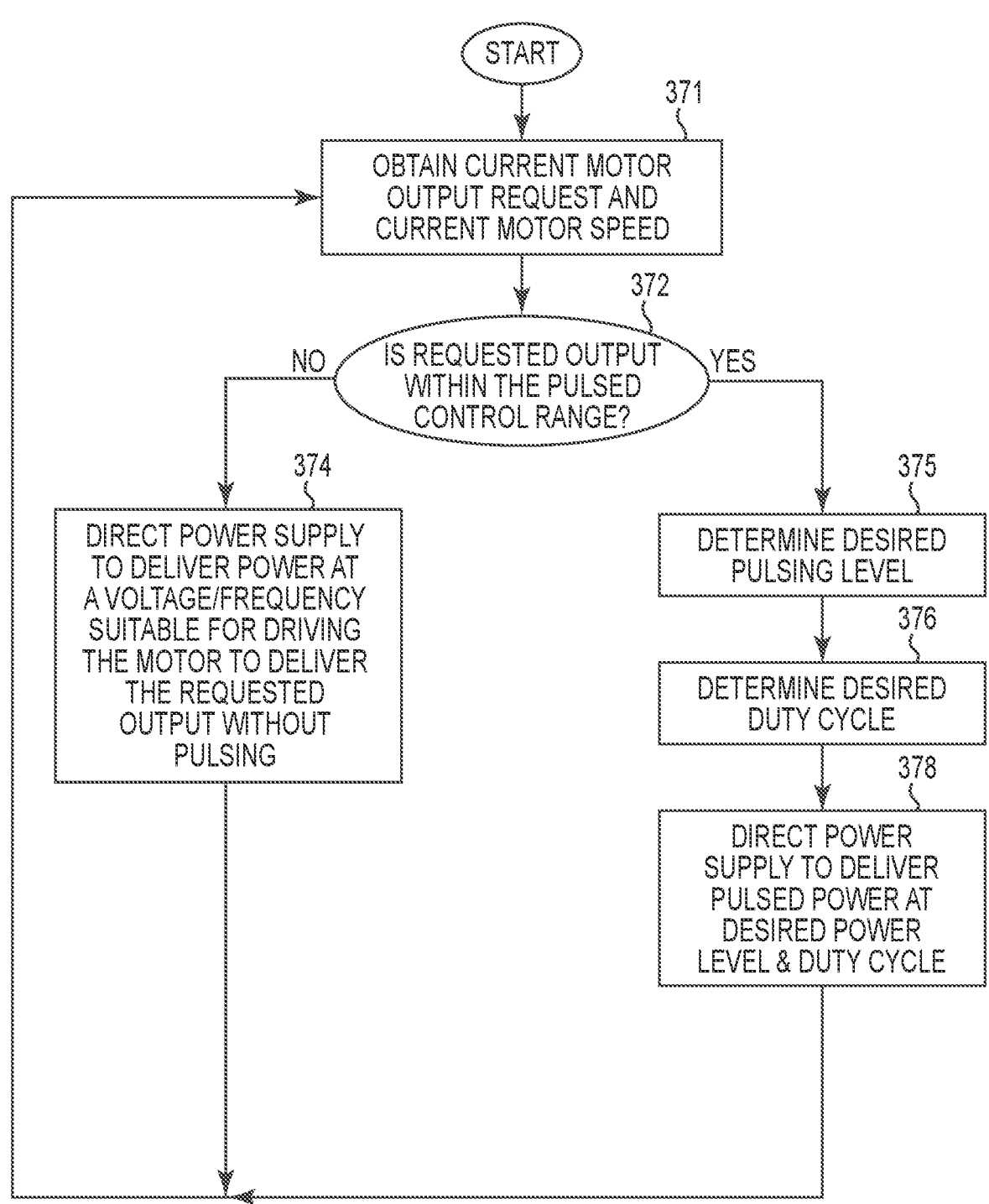
FIG. 3 is a flow chart illustrating a motor control scheme in accordance with embodiments of the present disclosure.

FIG. 3 is a flow chart illustrating a motor control scheme in accordance with embodiments of the present disclosure. FIG. 3 illustrates a control flow that may be performed by machine controller (e.g., 110 of FIG. 1) to cause the electric machine (160) to efficiently deliver a desired torque. To simplify the discussion, an embodiment in which the electric machine (160) functions as a motor is described. In this arrangement, the power supply/sink (130) acts as a power supply and the machine controller (110) functions as a motor controller.

Initially, the motor controller (110) receives the currently requested motor output (113) and any required motor state information such as the current motor speed (164) as represented by block 371. The motor controller (110) then determines whether the requested output is within the pulsed control range as represented by decision block 372. This decision can be made in any desired manner.

By way of example, in some embodiments, a look-up table (115) or other suitable data structure can be used to determine whether pulsed control is appropriate. In some implementations a simple lookup table may identify a maximum torque level at which pulsed control is appropriate for various motor speeds. In such an implementation, the current motor speed may be used as an index to the lookup table to obtain a maximum torque level at which the pulsed control is appropriate under the current operating conditions. The retrieved maximum torque value can then be compared to the requested torque to determine whether the requested output is within the pulse control range.

In other embodiments, the lookup table may provide additional information such as the desired duty cycle for pulsed operation based on the current operating conditions. In one such implementation, the motor speed and the torque request may be used as indices for a lookup table with each entry in the lookup table indicating the desired duty cycle with interpolation being used to determine an operational duty cycle when the actual torque and/or motor speeds are between the index values represented in the table.

If the requested torque/current operating conditions are outside of the pulsed control range for any reason, then traditional (i.e., continuous/non-pulsed) motor control is used as represented by the "no" branch flowing from block 372. As such, pulsing is not used and the power converter is directed to deliver power to the motor at a level suitable for driving the motor to deliver the requested output in a conventional manner as represented by block 374.

Conversely, when the requested torque/current operating conditions are within the pulsed control range, then pulsed control is utilized as represented by the "yes" branch flowing from block 372. In such embodiments, the motor controller will direct the power converter to deliver power to the motor in a pulsed manner.

During the "on" pulses, the power converter is directed to deliver power at a preferred output level which would typically (but not necessarily) be at or close to the maximum efficiency operating level for the current motor speed. During the "off" pulses, the motor ideally outputs zero torque. In some embodiments, the timing of the pulsing is controlled by pulse controller.

To facilitate pulsed operation, the motor controller determines the desired output level at block 375 and the desired duty cycle at block 376 for pulsed operation at the current motor speed (which is preferably at or close to the system's maximum efficiency energy conversion output level at the current motor speed, although other energy efficient levels can be used as appropriate). The motor controller and the pulse controller then direct the power converter to implement the desired duty cycle at block 378 at the designated power level.

Conceptually, this may be accomplished by effectively turning the power supply on and off at a relatively high frequency such that the fraction of the time that power is supplied to the motor corresponds to the desired duty cycle, and the power level corresponds to the preferred output level. In some embodiments, the "off" portion of the duty cycle may be implemented by directing the power controller/converter to drive the motor to deliver zero torque.

The frequency at which the power is pulsed is preferably determined by the machine controller or the pulse controller. In some embodiments, the pulsing frequency can be fixed for all operation of the motor, while in others it may vary based on operational conditions such as motor speed, torque requirements, etc. For example, in some embodiments, the pulsing frequency can be determined through the use of a look-up table.

In such embodiments, the appropriate pulsing frequency for current motor operating conditions can be looked up using appropriate indices such as motor speed, torque requirement, etc. In other embodiments, the pulsing frequency is not necessarily fixed for any given operating conditions and may vary as dictated by the pulse controller. In some specific embodiments, the pulsing frequency may vary proportionally as a function of motor speed, at least in some operating regions of the motor.

Further, in order to determine the desired pulsing level 375 and the desired duty cycle 376 multiple torque values need to be determined during operation of the motor. This can be accomplished utilizing the torque averaging methodology based on integer multiples as described herein. Through use of the disclosed methodology, the pulsed power delivery, at 378, will be at a more accurate power level and/or duty cycle than could have been accomplished previously. It should be noted that in, representing a potential power estimation methodology, the details of pulsing could involve several solutions to adequately address vibration and/or noise while delivering optimal efficiency.

Figure 4:
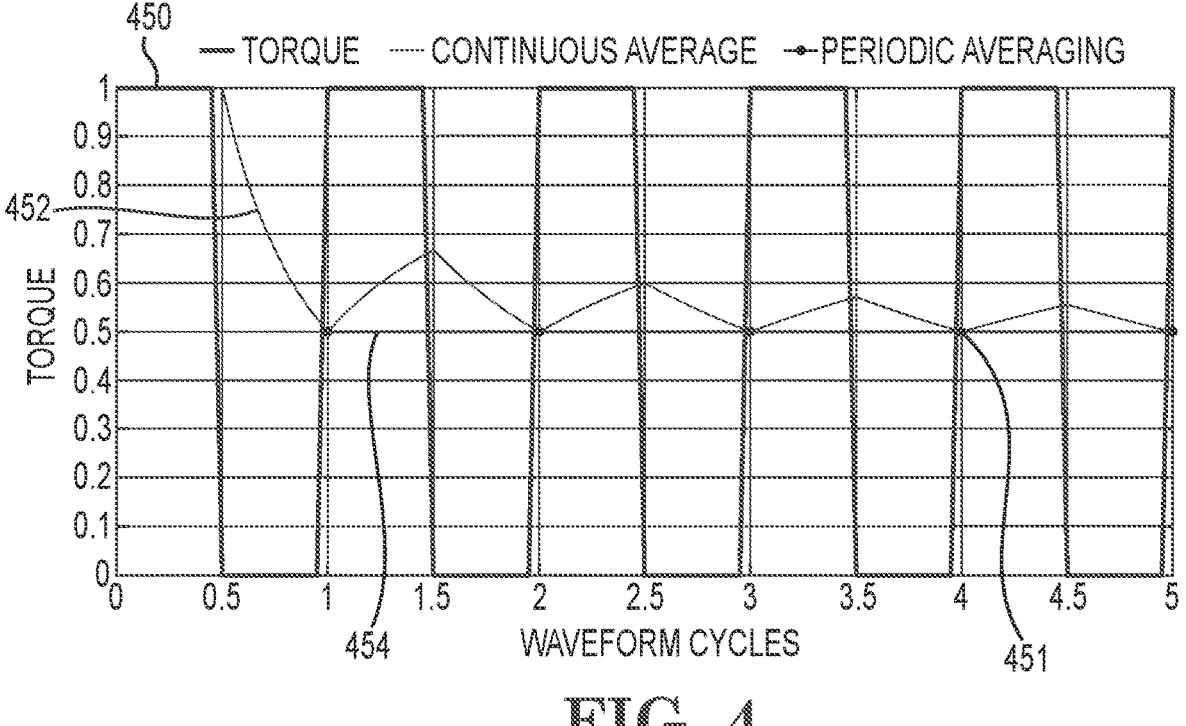
FIG. 4 is a graph diagrammatically representing the desired power estimation methodology for pulsed power that may be used with embodiments of the present disclosure.

FIG. 4 is a graph diagrammatically representing a potential power estimation methodology for pulsed power that may be used with embodiments of the present disclosure. FIG. 4 illustrates a difference between actual torque output 450, continuous averaging 452, and averaging based on the period of the waveform cycle 454.

As illustrated in FIG. 4, the actual torque 450 is shown as beginning, at the left side of the graph, delivering torque and, therefore, has a torque value of "1" (on the left axis) for half of the waveform cycle (i.e., from 0 to 0.5, where the waveform cycle time period is from 0 to 1 on the bottom axis). This segment having the value of "1" represents a torque pulse. Torque pulses are also shown at approximately 1-1.5, 2-2.5, 3-3.5, 4-4.5, and beginning at approximately 5. Between these pulses, the torque goes to 0 and stays there until the next pulse begins. This is the actual torque provided.

Also shown in FIG. 4 is a continuous average 452 based on a continuous average methodology. In this implementation, averaging is done by the controller at 1 millisecond intervals. Since, in this example, averaging begins when the torque value is a constant 1 and, therefore, the average is also 1. However, when the torque goes to 0, the continuous average value begins to fall toward 0.5 (which is the more accurate periodic average as will be discussed in detail below). Then, after a period of time, the torque begins to be delivered and the torque value again jumps to 1. Accordingly, the continuous average begins to increase again. As can be seen by the illustration, the continuous average improves over time, as more data points are averaged, the more time taken to bring the average down to an accurate depiction of the torque, the longer the delay in being able to make an accurate change in torque.

As discussed herein, the periodic average 454 based on integer multiples methodology as discussed in the present disclosure is significantly more accurate, which can improve electric machine performance and efficiency and with low latency as the averaging can occur in as little as one waveform cycle. As can be seen in FIG. 4, this average is accurate as the torque net output is 0.5 over the entire waveform shown and in each waveform cycle.

Further, although the example of FIG. 4 shows the averaging occurring at points 451 at 1, 2, 3, 4, and 5 (on the horizontal axis), the actual starting and ending points within the cycle can change, so long as the average is an integer multiple of a waveform in length (e.g., averaging from 1.25-2.25 (integer multiple of 1) or from 1.4-3.4 (integer multiple of 2)). Embodiments can average all data points between the starting point and the ending point in the range (e.g., between 1.25 and 2.25). Additionally, averaged points 451 can be collected and used to create another, longer average.

In some embodiments, an average can be taken for a portion of the waveform cycle that is less than a full waveform cycle, such as at time 0.0 to 0.5 (1.0 to 1.5, 2.0 to 2.5 . . . ) or at 0.5 to 1.0 (1.5 to 2.0, 2.5 to 3.0, 3.5 to 4.0 . . . ), but are made at integer periods of the waveform. Information about these time periods can also be beneficial in making electric machine management decisions.

In various embodiments, the torque values can be estimated (e.g., based on data collected from the particular electric machine that is being controlled or from one or more other electric machines and stored in memory, for example, accessible by the controller) or measured via sensors associated with the particular electric machine that is being controlled. Torque can, for example, be measured by sensing the speed of a rotor of the electric machine. Implementations can also measure a current or voltage going into an electric machine to determine its corresponding torque value.

Figure 5:
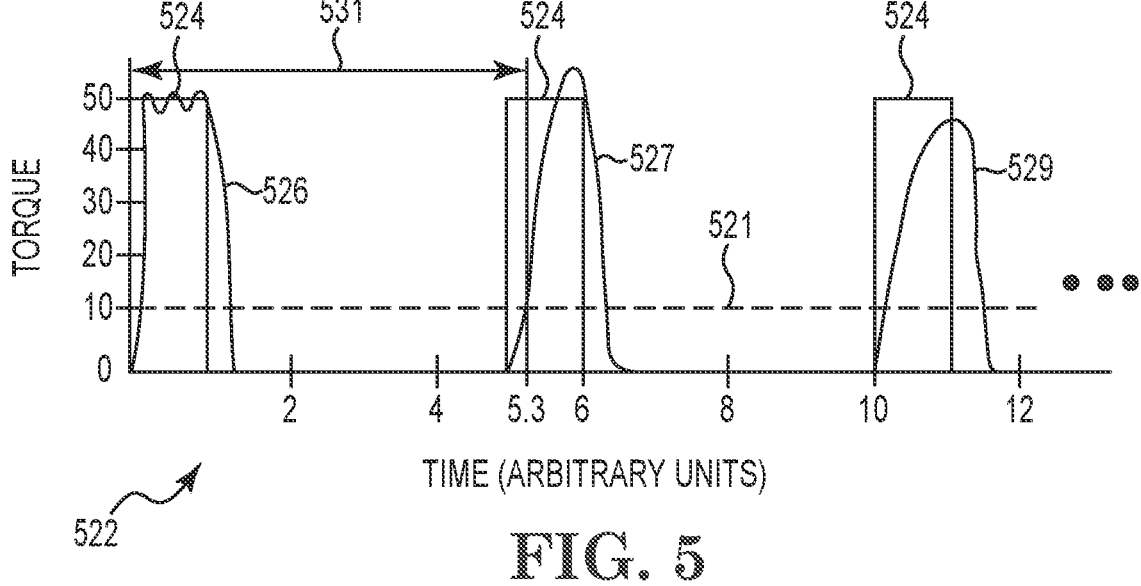
FIG. 5 is a graph illustrating another pulsed drive signal methodology for an electric machine that may be used with embodiments of the present disclosure.

FIG. 5 is a graph illustrating another pulsed drive signal methodology for an electric machine that may be used with embodiments of the present disclosure. If, in this illustrative example, an ideal waveform is going to have a rectangular shape and the pulse width can be determined, then it can be estimated what the torque value will be at non-integers, such as 5.3, time units.

For instance, if the desired continuous torque is 10 and the optimal torque is 50, the effective duty cycle would be ⅕=20%, and 1 out of five time steps would nominally generate torque. If 5.3 time steps have traversed, starting with a torque generation condition, there would be one time step at 50, four time steps at 0, and 0.3<NOT 3> time step at 50 again. So, 50+0+0+0+(0.3)*50=65.

Comparing the measured value through the 5.3 time steps and dividing by the nominal 65. The comparison could, for example, be accomplished by subtracting one from the other or dividing one by the other.

In some implementations, the speed of the integer analysis may be too slow and so a non-integer estimation as discussed here would be beneficial. For instance, the graph in FIG. 5 illustrates a series of commands 524 asking for torque to be provided. These commands are estimated to be instituted in an ideal manner (perfectly executed, hence the rectangular shape).

However, in real conditions, the command execution may be less than ideal as shown at 526, 527, and 529. These represent the actual timing and magnitude of the torque provided over time. These torque pulses are imperfect. This imperfect torque control can, for example, be due to the torque controller interfacing with the physical motors, among other factors. Other example factors could be temperature of physical components (e.g., controller, motors, wiring), the presence of a magnetic field interfering with physical components, manufacturing imprecision (e.g., calculation/measurement of voltage), other noise factors that can disrupt the precision of the calculations of the torque pulse values and/or timing of their execution. Another cause may be feedback delay, where although the controller is operating relatively quickly (e.g., 10 kHz), it is not instantaneous as the ideal implementation would demand, and so there will inherently be imperfection when comparing to an ideal model.

For instance, torque pulse 526 does not achieve the desired torque instantaneously at time=0. The torque does not remain steady throughout the time the torque is provided, showing several oscillations above and/or below the ideal torque value. The torque also tapers off rather than instantaneously shutting off at time=1.

For the second torque pulse 527, takes time after time=5, overshoots the desired torque value=50, and then, again, tapers off after the ideal shut off time=6. And, the last torque pulse 529 never reaches the desired torque value=50 as it undershoots the value over the whole pulse time period=10 to 11 and then tapers off well after the end of the ideal end of the pulse=11.

Averaging on an integer basis is one way to improve the performance of torque pulsing systems by addressing the imperfections (delayed start or end, over shooting, under shooting, tapering). Another solution is non-integer based and involves averaging at non-integer points in time as is disclosed below.

For instance, the controller may receive sensor data indicating that the torque value is still=30 Nm at time=1.2 when in the ideal model torque should be 0 Nm. Under current systems, the controller would try to shut off torque completely. However, in real world conditions, the goal could be to maintain a 10 Nm average (dashed horizontal line 521 in FIG. 5, which, as shown, includes both torque on and torque off periods over the time illustrated) over time to provide the torque requirements (e.g., for a vehicle power demand).

One other issue is that with an integer of 7 in the example of FIG. 3, some averaging calculations would have one pulse and others would have two. Further, an integer of 1 might encompass a complete on period or off period which may be difficult to reconcile with the overall goal of 10 Nm.

In these embodiments, irregular time increments can be used to determine the averaging. One such increment is illustrated at 531 and is a length of t=5.3. These embodiments can be referred to as continuous averaging embodiments. In such embodiments, for each averaging computation an arbitrary number of pulses or portions thereon can be selected. In FIG. 5, the position of time=0 being at the start of the first pulse is convenient but not necessary. Time=0 could be at any point in time with respect to the pulses.

In continuous averaging embodiments, any integer or non-integer time period can be averaged. Then, the measured torque over that time is compared with the estimated model torque from the ideal model to determine whether the measured average torque is outside a threshold value. An out of threshold value indicates that the motor is operating in an unsafe state, while a value within the threshold indicates operation in a safe state. An unsafe state means that the motor may become damaged due to its operation outside the threshold value.

For continuous averaging, the averaging time periods overlap with at least the two adjacent to it. Example time ranges for continuous averaging with respect to FIG. 5 could, for example, be 0-5.3, 1-6.3, 2-7.3, 3-8.3, 4-9.3, etc. In this example, it was desired to have an average taken from about 5 units of time without being exactly 5 units. However, any number could be used as the time range for averaging. In this manner, torque can be more closely controlled over a period of time whether there is a prediction of torque that pulses between increasing and decreasing states and comparing an average of an estimated pulsed torque, over the period of time having an arbitrarily selected number of pulsed torque cycles, with an average of measured pulsed torque values over the same time period.

Embodiments of the present disclosure provide methods, systems, and devices for electric machine torque adjustment based on waveform integer multiples. These embodiments can improve the performance and/or efficiency of an electric machine, as well as prevention of false positive fault detections, by providing more accurate estimated torque values through use of integer multiples of the waveform cycles of a pulsed waveform.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An electric machine controller arranged to direct pulsed operation of an electric machine, wherein the electric machine controller utilizes a pulse controller that calculates a first average measured torque from sensed torque values over a first time period and a second average measured torque from sensed torque values over a second time period, wherein the first and second time periods are different time periods;

wherein the machine controller is configured to vary a first output level in accordance with variations in at least one of an operating speed, a torque, and a rotational speed times a number of poles of the electric machine.

2. The electric machine controller of claim 1, wherein the pulse controller determines whether the electric machine is operating in a safe state based on the calculated first average measured torque and second average measured torque.

3. The electric machine controller of claim 1, wherein the first average measured torque and second average measured torque are compared to a threshold to determine whether a safety process needs to be initiated.

4. The electric machine controller of claim 1, wherein the first and second time periods overlap.

5. The electric machine controller of claim 1, wherein a period between sequential first output level pulses is the waveform cycle, and the waveform cycle varies during operation of an electric machine.

6. The electric machine controller of claim 1, wherein the waveform cycle varies as a function of a rotational speed of the electric machine.

7. An electric machine controller arranged to direct pulsed operation of an electric machine, wherein the electric machine controller utilizes a pulse controller that calculates an average torque based upon a time period that corresponds with a non-integer multiple of a waveform cycle or subcycle of a pulse waveform.

8. The electric machine controller of claim 7, wherein first and second output levels are selected such that the electric machine has a higher energy conversion efficiency during the pulsed operation of the electric machine than the electric machine would have when operated at a third output level that would be required to drive the electric machine in a continuous manner to deliver the desired output.

9. The electric machine controller of claim 8, wherein during the pulsed operation of the electric machine, the electric machine is turned off for at least portions of the times that the electric machine outputs zero torque.

10. The electric machine controller of claim 7, wherein a period between beginnings of sequential first output level pulses is the waveform cycle, and the waveform cycle varies during operation of the electric machine.

11. The electric machine controller of claim 10, wherein the waveform cycle varies as a function of a rotational speed of the electric machine.

12. A system comprising:
an electric machine;
a power converter; and
an electric machine controller arranged to direct pulsed operation of an electric machine, wherein the electric machine controller utilizes a pulse controller that calculates a first average measured torque from sensed torque values over a first time period and a second average measured torque from sensed torque values over a second time period, wherein the first and second time periods are different time periods; and wherein a period between sequential first output level pulses is the waveform cycle, and the waveform cycle varies during operation of an electric machine.

13. The system of claim 12, wherein the electric machine is operating as a motor and the power converter includes an inverter.

14. The system of claim 12, wherein the electric machine is operating as a generator and the power converter includes a rectifier or inverter.

15. The system of claim 12, wherein the electric machine is configured to operate as a motor/generator.

16. The system of claim 15, wherein the pulse controller is configured to cause the electric machine to switch between first and second output levels at least 100 times per second.

17. The system of claim 12, wherein the electric machine is selected from the group including:
a synchronous reluctance machine,
a permanent magnet synchronous reluctance machine;
a hybrid permanent magnet synchronous reluctance machine;
a switched reluctance machine;
an externally excited AC synchronous machine; and
a permanent magnet synchronous machine.

18. The system of claim 12, wherein the electric machine is selected from the group including:
an electrically excited DC electric machine;
a permanent magnet DC electric machine;
a series wound DC electric machine;
a shunt DC electric machine;
a brushless DC electric machine;
a brushed DC electric machine; and
a compound DC electric machine.

19. The system of claim 12, wherein the electric machine is selected from the group including:
an eddy current machine;
an AC linear machine;
an AC and DC mechanically commutated machine; and
an axial flux machine.

20. A method, comprising:
providing an electric machine controller arranged to direct pulsed operation of an electric machine; and
calculating, using a pulse controller, an average torque;
wherein the average torque is based upon a time period that corresponds with a non-integer multiple of a waveform cycle or sub-cycle of a pulse waveform.

* * * * *